United States Patent
Rival et al.

(10) Patent No.: US 10,483,749 B2
(45) Date of Patent: Nov. 19, 2019

(54) SHORT-CIRCUITING DEVICE OF AN ELECTRICAL INSTALLATION AND SYSTEM FOR EXTINGUISHING AN ELECTRICAL ARC THAT MAY APPEAR IN SUCH AN INSTALLATION

(71) Applicant: SCHNEIDER ELECTRIC INDUSTRIES SAS, Rueil-Malmaison (FR)

(72) Inventors: Marc Rival, Saint Ismier (FR); Denis Giraud, Grenoble (FR); Daniel Rota, Vif (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 200 days.

(21) Appl. No.: 15/035,376

(22) PCT Filed: Dec. 9, 2014

(86) PCT No.: PCT/EP2014/076994
§ 371 (c)(1),
(2) Date: May 9, 2016

(87) PCT Pub. No.: WO2015/086571
PCT Pub. Date: Jun. 18, 2015

(65) Prior Publication Data
US 2016/0276822 A1    Sep. 22, 2016

(30) Foreign Application Priority Data

Dec. 10, 2013 (FR) ...................................... 13 62340

(51) Int. Cl.
| | |
|---|---|
| *H02H 3/08* | (2006.01) |
| *H02H 1/00* | (2006.01) |
| *H02H 3/02* | (2006.01) |
| *H01C 7/06* | (2006.01) |
| *H01C 1/014* | (2006.01) |

(52) U.S. Cl.
CPC ................. *H02H 3/08* (2013.01); *H01C 7/06* (2013.01); *H02H 1/0023* (2013.01); *H02H 3/02* (2013.01); *H02H 3/023* (2013.01); *H01C 1/014* (2013.01)

(58) Field of Classification Search
CPC ........ H01C 1/014; H01C 7/06; H02H 1/0023; H02H 3/02; H02H 3/023; H02H 3/08; H02H 1/00; H02H 7/22; H02H 3/10
See application file for complete search history.

(56) References Cited

U.S. PATENT DOCUMENTS

| | | | |
|---|---|---|---|
| 2,999,912 A * | 9/1961 | Kincaid | ................. H01H 39/00 200/16 B |
| 4,858,054 A | 8/1989 | Franklin | |

(Continued)

FOREIGN PATENT DOCUMENTS

| | | | | |
|---|---|---|---|---|
| DE | 10 2009 031 647 A1 | | 1/2011 | |
| DE | 102009031647 A1 | * | 1/2011 | ........... H02H 1/0023 |
| EP | 2573785 A1 | * | 3/2013 | ........... H01H 31/003 |

OTHER PUBLICATIONS (AK Steel [online]. aksteel.com [retrieved on Jul. 30, 2007]. Retrieved from the Internet: <URL://www.aksteel.com/pdf/markets_products/stainless/austenitic/304_304l_data_sheet.pdff>.*

(Continued)

*Primary Examiner* — Thienvu V Tran
*Assistant Examiner* — Nicolas Bellido
(74) *Attorney, Agent, or Firm* — Oblon, McClelland, Maier & Neustadt, L.L.P.

(57) ABSTRACT

A device for short-circuiting an electrical installation that includes at least two electrical conductors, the device including at least two connection terminals, each configured to be connected to a respective electrical conductor, an electromechanical unit configured to establish a short-circuit between the connection terminals, and at least one resistive (Continued)

element configured to connect one of the connection terminals to the corresponding electrical conductor. Each resistive element includes a first connection end connected to the corresponding connection terminal and a second connection end configured to be connected to the corresponding electrical conductor. The resistive element has an impedance, and variation in a value of the impedance is less than 1 mΩ for a temperature of the resistive element of 0° C. to 200° C.

10 Claims, 6 Drawing Sheets

(56) References Cited

U.S. PATENT DOCUMENTS

| | | | | |
|---|---|---|---|---|
| 5,650,902 | A * | 7/1997 | Herkenrath | H02B 13/025 361/13 |
| 6,538,554 | B1 * | 3/2003 | Berger, II | H01C 7/06 29/610.1 |
| 8,563,888 | B2 * | 10/2013 | Bohori | H01T 1/00 218/147 |
| 2008/0239592 | A1 * | 10/2008 | Roscoe | H01T 2/02 361/7 |
| 2008/0239598 | A1 * | 10/2008 | Asokan | H01T 2/02 361/56 |
| 2009/0120773 | A1 * | 5/2009 | Gentsch | H01H 39/004 200/239 |
| 2015/0092304 | A1 * | 4/2015 | Rival | H02H 1/0015 361/3 |

OTHER PUBLICATIONS

International Search Report dated Jul. 13, 2015 in PCT/EP14/76994 filed Dec. 9, 2014.

Detlef Mietke, "Das Temperaturverhalten—der Temperaturkoeffizient", Sep. 30, 2014, XP007922854, http://elektroniktutor.oszkim.de/bauteilkunde/tempkoef.html, (1 page).

* cited by examiner

SHORT-CIRCUITING DEVICE OF AN ELECTRICAL INSTALLATION AND SYSTEM FOR EXTINGUISHING AN ELECTRICAL ARC THAT MAY APPEAR IN SUCH AN INSTALLATION

The present invention relates to a device for shorting an electrical installation and a system for quenching an electric arc liable to occur in such an installation.

In the field of electrical installation protection, a persistent issue is protecting the electrical installation against an electric arc liable to occur following an internal fault in the installation. The electric arc is generally produced between phase conductors of the installation.

The electric arc is accompanied by the release of a large amount of energy over a very short time. The energy is released particularly in the form of heat and in the form of an explosion that generates a shockwave through the air. Thus, the occurrence of the electric arc is both destructive to the installation and dangerous to people located nearby.

In order to protect the electrical installation and people located nearby, the main objective is to suppress this arc quickly, i.e. in less than 2 milliseconds (ms), for example. It is thus known practice to use a shorting device allowing a short circuit to be created upstream of the electric arc with respect to a power source supplying electric power to the installation. The shorting device is also positioned downstream of a circuit breaker connecting the power supply source and the electrical conductors of the installation. Thus, on detection of an electric arc, the shorting device shorts the electrical conductors, an electric current corresponding to the electric arc then flows through the shorting device, and the electric arc disappears. However, this shorting operation causes a short-circuit current to flow through part of the installation between the shorting device and the power supply source until the circuit breaker opens. The short-circuit current generates considerable stresses which are exerted on this part of the installation until the opening of the circuit breaker, thereby decreasing the life of the installation.

In order to minimize the stresses to which the electrical installation is subjected when the electric arc occurs and the shorting device sets up a short circuit in the installation, it is known practice from the document DE-A-10 931 647 to connect a current limiter device between the shorting device and the electrical conductors. Such a current limiter device may be likened to switches which are kept in the closed position and which open, following the detection of the electric arc, only when the electric arc has passed into the shorting device and has disappeared, i.e. when a voltage measured across the electrical conductors is below a predetermined threshold.

However, such a solution is complex to implement, and as long as the voltage measured across the electrical conductors is above the predetermined threshold, considerable stresses are exerted on the installation. Thus, such a device does not allow the stresses exerted on the installation to be effectively reduced, and the installation is therefore occasionally subjected to considerable stresses that result in its aging and deterioration.

The aim of the invention is therefore to propose a shorting device allowing an electric arc to be very quickly quenched, while limiting the stresses to which the installation is subjected following the shorting of the installation.

To this end, the invention relates to a device for shorting an electrical installation comprising at least two electrical conductors, the device comprising at least two connection terminals, each being capable of being connected to a respective electrical conductor, an electromechanical block capable of setting up a short circuit between the connection terminals, at least one resistor element capable of connecting one of the connection terminals to the corresponding electrical conductor, the or each resistor element comprising a first connection end connected to the corresponding connection terminal and a second connection end capable of being connected to the corresponding electrical conductor. In accordance with the invention, the resistor element has an impedance, and the variation in the value of the impedance is less than 1 mΩ for a temperature of the resistor element of between 0° C. and 200° C.

By virtue of the invention, the resistor element(s) allow the stresses to which the installation is subjected to be significantly reduced while allowing the electric arc to be quenched. Specifically, the resistor element(s) allow(s) the peak value, as well as the mean value, of the current flowing through the electrical conductors to be reduced. More specifically, at the moment at which the electromechanical block sets up a short circuit between the connection terminals, and hence between the electrical conductors, the stresses to which the electrical installation is subjected are generally very large, and the use of the resistor element(s) allows the short-circuit current flowing through the electrical conductors to be limited in order to limit the stresses to which the installation is subjected, without significantly increasing the time taken to quench the electric arc.

According to other advantageous aspects of the invention, the shorting device comprises one or more of the following features, taken in isolation or in any technically possible combination:

- the impedance value of the resistor element is between 0.3 mΩ and 1 mΩ, preferably between 0.5 mΩ and 0.6 mΩ, for a temperature of the resistor element of between 0° C. and 100° C.;
- the electromechanical block comprises a moving member capable of switching between a rest position in which the connection terminals are electrically isolated from one another and a short-circuit position in which the connection terminals are mutually connected;
- the device comprises multiple resistor elements, each connection terminal being connected to the first connection end of a respective resistor element, while the resistor elements are electrically isolated from one another;
- the or each resistor element is made of stainless steel;
- the or each resistor element comprises an edge connecting the first connection end and the second connection end, while the or each resistor element has a cross section, perpendicular to the corresponding edge, that is greater than or equal to 400 mm$^2$;
- at least one connection terminal is raised by a height with respect to the other connection terminal(s), the raised height being between 2 cm and 4 cm;
- the or each resistor element is in boustrophedon form.

Another subject of the invention is a system for quenching an electric arc liable to occur in an electrical installation, the installation comprising at least two electrical conductors, the system comprising at least one device for detecting the electric arc on each conductor, at least one electrically isolating circuit breaker connected to the electrical conductors between the electrical installation and a power supply source of this electrical installation, a shorting device connected to the electrical conductors, an electronic unit for controlling the shorting device, capable of controlling the shorting device so that it is in a state for setting up a short circuit between the electrical conductors when the electric arc is detected by the detection device, and a member for tripping the electrical circuit breaker(s) when the electric arc is detected by the detection device. In accordance with the invention, the shorting device is as described above.

According to another advantageous aspect of the quenching system, the shorting device is positioned downstream of the electrically isolating circuit breaker(s) with respect to the electrical power supply source.

The invention will be better understood and other advantages thereof will become more clearly apparent in light of the following description, given solely by way of non-limiting example and making reference to the drawings, in which.

Figure 1:
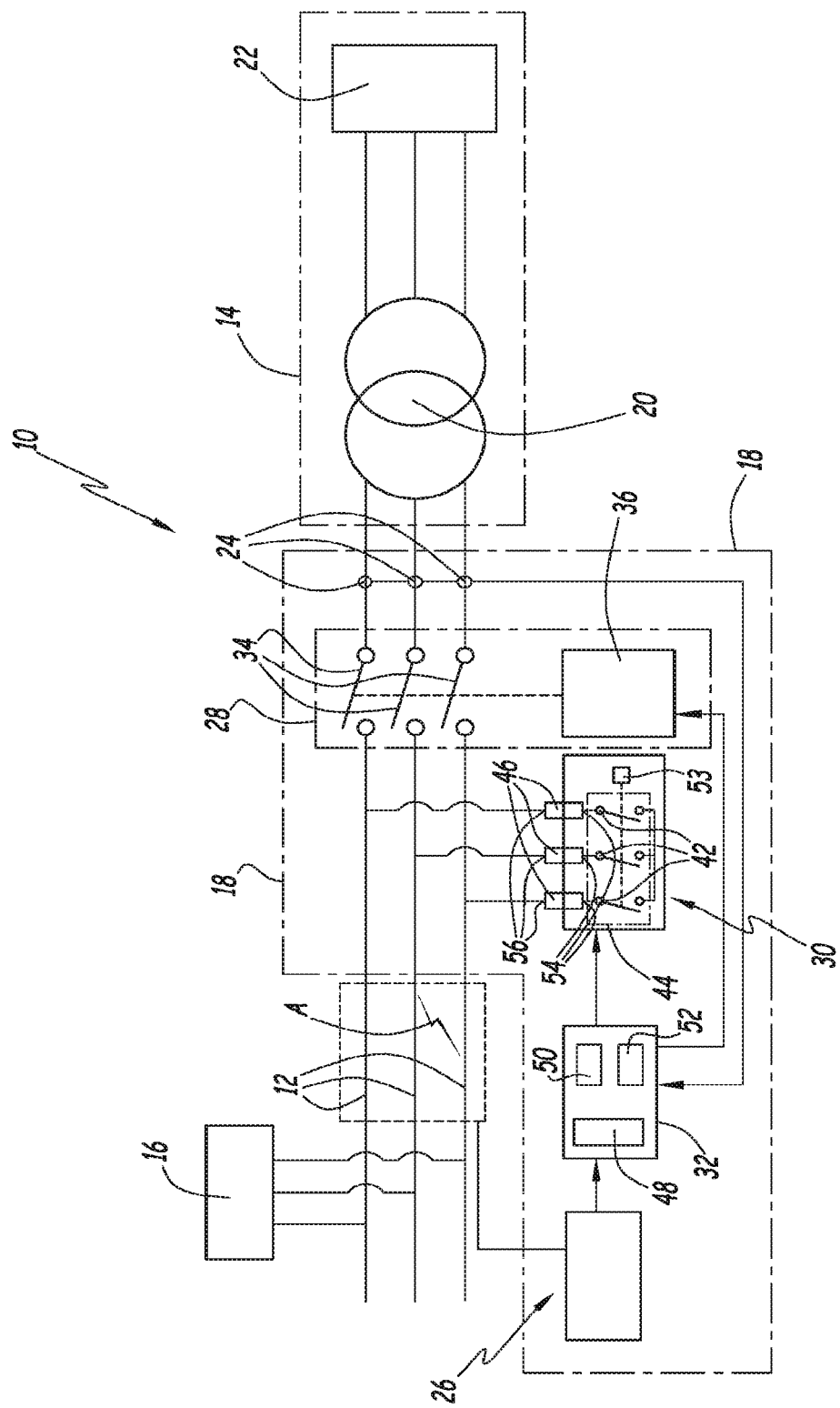
FIG. 1 is a diagrammatic representation of an electrical installation comprising three electrical conductors and equipped with a system for quenching an electric arc in accordance with a first embodiment of the invention, the quenching system comprising an electrical shorting device.

In FIG. 1, a three-phase electrical installation 10 comprises three electrical conductors 12, each corresponding to one phase, the conductors 12 being connected to a three-phase power supply source 14.

The conductors 12 are connected to an electrical load 16 that they supply with electric power and to a system 18 for quenching an electric arc A, the arc A being liable to occur in the installation 10 between the electrical conductors 12.

The power supply source 14 comprises an electrical transformer 20 intended to be connected to an electrical grid 22.

The quenching system 18 comprises a current sensor 24 for each conductor 12 and an optical sensor 26 capable of detecting a flash or flare of light produced by the electric arc A when it occurs between the electrical conductors 12. The quenching system 18 comprises a three-phase circuit breaker 28 positioned between the power source 14 and the load 16 and capable of electrically isolating the power source 14 with respect to the installation 10 in the event of an electrical fault.

The quenching system 18 also comprises a device 30 for shorting the electrical conductors 12 and a processing unit 32 capable of controlling the shorting device 30 and the circuit breaker 28 and of processing data transmitted by the current sensors 24 and the optical sensor 26.

The electrical transformer 20 is capable of transforming the electric current delivered by the grid 22 and having a first AC voltage into another electric current having a second AC voltage.

The electrical grid 22 is an AC grid, such as a three-phase grid. The electrical grid 22 is, preferably, a medium voltage grid, i.e. a grid whose voltage is higher than 1000 volts and lower than 50 000 volts. The first AC voltage is then a medium voltage and the second AC voltage is, for example, a low voltage, i.e. a voltage that is lower than 1000 volts. The electrical transformer 22 thereby divides the three-phase electrical installation 10 into a medium voltage side and a low voltage side.

The current sensors 24 are positioned around each electrical conductor 12 and are arranged between the power supply source 14 and both the shorting device 30 and the circuit breaker 28. Each current sensor 24 comprises, for example, a Rogowski torus arranged around the corresponding electrical conductor 12.

The optical sensor 26 is capable of detecting a flash or flare of light produced by the occurrence of the electric arc A across the conductors 12, knowing that the electric arc A occurs downstream of the shorting device 30 with respect to the power supply source 14 located upstream. The optical sensor 26 is, for example, as described in the application EP-A1-0575932 on page 3, lines 18 to 23, and on Page 5, lines 9 to 18.

The three-phase circuit breaker 28 is capable of electrically isolating the power supply source 14 from the installation 10 by cutting the supply of power to the conductors 12. As shown in FIG. 1, the circuit breaker 28 may be likened to three switches 34 connected to the conductors 12 and an actuator 36 for controlling the switches 34. The circuit breaker 28 is movable between two positions, namely an open position, in which the switches 34 are in the open position and interrupt the flow of the current through the electrical conductors 12, and a closed position, in which the switches 34 are in the closed position and allow the current to flow through the electrical conductors 12.

The shorting device 30 comprises three connection terminals 42, each being capable of being connected to a respective electrical conductor 12, and a parallelepipedic electromechanical block 44 capable of setting up a short circuit between the connection terminals 42.

The shorting device 30 also comprises, for each connection terminal 42, a resistor element 46 capable of connecting the corresponding connection terminal 42 corresponding to the corresponding electrical conductor 12.

A longitudinal axis of the electromechanical block 44 and of the shorting device 30 is denoted by X.

A transverse axis of the electromechanical block 44 and of the shorting device 30, perpendicular to the longitudinal axis X and along which each resistor element 46 connects the corresponding connection terminal 42 and the corresponding electrical conductor 12, is denoted by Y.

A vertical axis perpendicular to the longitudinal axis X and to the transverse axis Y is denoted by Z.

The processing unit 32 comprises software 48 for detecting the electric arc A, an electronic unit 50 for controlling the shorting device 30 and, more specifically, the electromechanical block 44, and a member 52 for tripping the three-phase electrical circuit breaker 28.

The actuator 36 is capable of being controlled via the tripping member 52 in order to move the switches 34 into their open position, for which the flow of the current through the electrical conductors 12 is interrupted.

Figure 2:
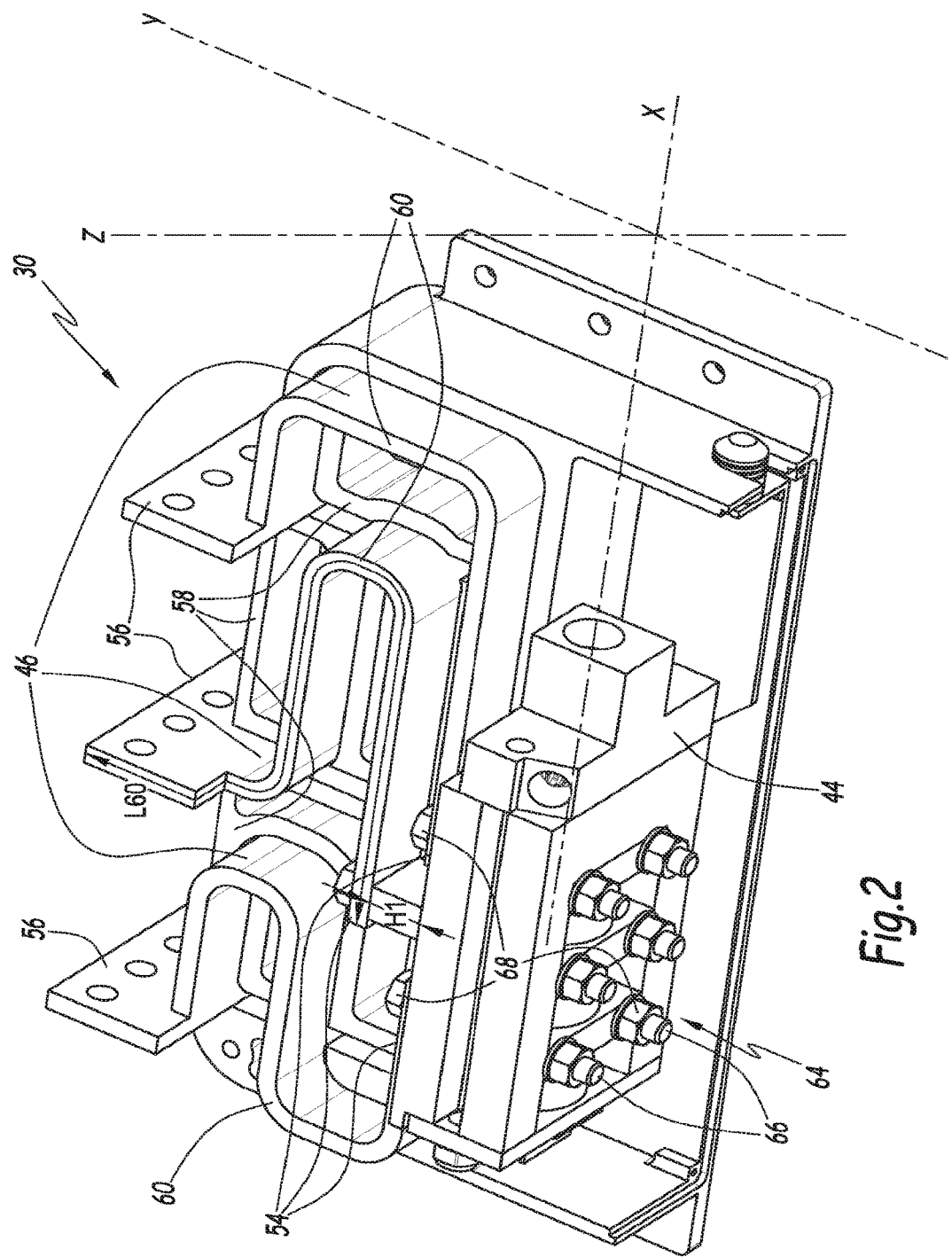
FIG. 2 is a perspective view of the shorting device of FIG. 1.

Each connection terminal 42 is capable of being connected, via the corresponding resistor element 46, to the corresponding electrical conductor 12. In FIG. 2, one of the connection terminals 42 is raised by a height H1 with respect to the other connection terminals 42. The raised height H1 is measured along the transverse axis Y and is between 2 cm and 4 cm.

The electromechanical block 44 is capable of setting up a short circuit between the connection terminals 42 by connecting them to one another. The electromechanical block 44 comprises a member 53 that moves, along the longitudinal axis X, between a rest position in which the connection terminals 42 are electrically isolated from one another and a short-circuit position in which the connection terminals 42 are mutually electrically connected.

The electromechanical block 44 is preferably in accordance with that described in the patent application FR-A1-2 980 301 from page 8, line 15, to page 11, line 31. The electromechanical block 44 extends along the longitudinal axis X.

Each resistor element 46 is designed to connect the corresponding connection terminal 42 to the corresponding electrical conductor 12. More specifically, each resistor element 46 comprises a first connection end 54 connected to the corresponding connection terminal 42 and a second connection end 56 capable of being connected to the corresponding electrical conductor 12. As shown in FIG. 2, the resistor elements 46 are electrically isolated from one another by dielectric elements 58, the dielectric elements 58 being arranged between two successive resistor elements 46. The resistor elements 46 are thus electrically isolated from one another when the moving member 53 is in the rest position, and electrically connected to one another when the moving member 53 is in the short-circuit position.

Each resistor element 46 has an impedance whose variation in value is less than 1 mΩ for a temperature of the resistor element 46 of between 0° C. and 200° C.

The value of the impedance of each resistor element 46 is, for example, between 0.3 mΩ and 1 mΩ preferably between 0.5 mΩ and 0.6 mΩ, for a temperature of the resistor element 46 of between 0° C. and 100° C.

In FIG. 2, each resistor element 46 is in boustrophedon form. The resistor elements 46 are made of stainless steel.

Each resistor element 46 comprises an edge 60 that extends between the first connection end 54 and the second connection end 56 over a curvilinear length L60 that is greater than 200 mm. Likewise, the cross section of the resistor elements, measured perpendicular to the edge 60, is greater than 400 mm².

Each resistor element 46 is, for example, made of stainless steel AISI 316L, the resistivity of which at 20° C. is equal to 75 μΩ·cm. Each resistor element 46 has, for example, a curvilinear length L60 that is equal to 340 mm and a cross section, measured perpendicular to the edge 60, that is equal to 500 mm². The resistor elements 46 are dimensioned so that their maximum temperature is less than 500° C. for a current flowing therethrough that is equal to 100 kiloamps (kA) over 50 milliseconds. Thus, each resistor element 46 has a volume V1 that is preferably greater than 80 cm³ (80 000 mm³).

In a variant, the material forming the resistor elements 46 differs from stainless steel, and the characteristics of this material and the dimensions of the resistor elements 46 are such that each resistor element 46 has an impedance whose value is between 0.3 mΩ and 1 mΩ, preferably between 0.5 mΩ and 0.6 mΩ, for a temperature of the resistor element 46 of between 0° C. and 100° C. In this variant, the material forming the resistor elements is, for example, a nickel-chromium alloy or an iron-chromium alloy of high electrical resistivity.

Each resistor element 46 is connected to the corresponding connection terminal 42 via two bolted connections 64.

The detection software 48 is capable, depending on the data measured by the optical sensor 26 and the current sensors 24, of detecting the occurrence of the electric arc A between the electrical conductors 12.

The detection software 48, the current sensor 24 and the optical sensor 26 may be likened to an electrical device for detecting the electric arc A.

The control unit 50 is capable of controlling the shorting device 30 so that it is in a state for setting up a short circuit between the electrical conductors 12 when the electric arc A is detected by the detection software 48. More specifically, the electronic control unit 50 is capable of acting on the electromechanical block 44 in such a way as to control the movement of the moving member 53 toward its short-circuit position when the electric arc A is detected.

The tripping member 52 is capable of controlling the actuator 36 in order to move the circuit breaker 28 into the open position when the electric arc A is detected by the detection software 48.

The time taken by the circuit breaker 28 to move into its open position, following the detection of the electric arc A by the detection software 48, is generally less than 50 ms. Thus, the time taken for removing the short circuit created by the shorting device 30 is less than 50 ms for the installation 10. Each first connection end 54 comprises, along the transverse axis Y, two through holes, which are not visible in the various figures.

Each bolted connection 64 comprises a threaded through rod 66 that is positioned, along the transverse axis Y, through the electromechanical block 44 and the corresponding through hole and two bolts 68 that are screwed onto the threaded rod 66 in order keep each resistor element 46 in position with respect to the electromechanical block 44.

Figure 3:
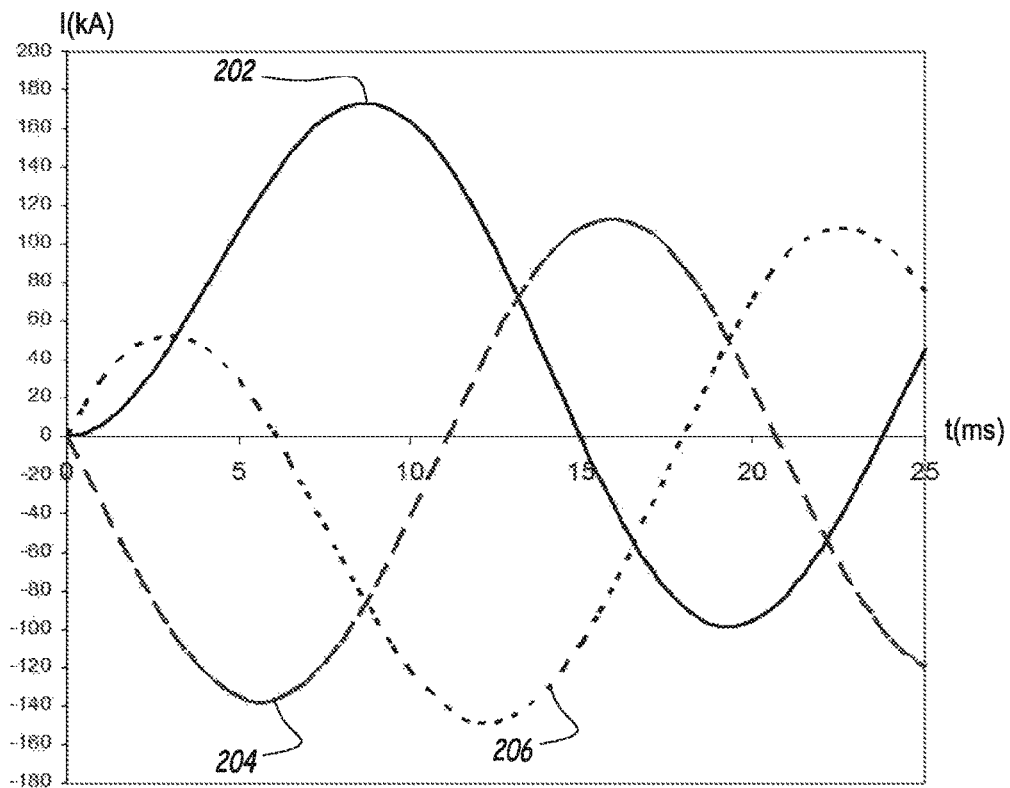
FIG. 3 is a set of three curves representing a current flowing through each of the electrical conductors of FIG. 1 during the setting up, by the shorting device, of a short circuit between the electrical conductors.

In FIG. 3, first 202, second 204 and third 206 curves represent the current, in terms of peak value, respectively flowing through each of the three electrical conductors 12 for the resistor elements 46, the impedance of which is equal to 0.6 mΩ, and when the electromechanical block 44 transitions from its rest position to its short-circuit position. The first 202, second 204 and third 206 curves shown are obtained for a three-phase current delivered to the electrical conductors 12 by the transformer 20, the RMS value of which is equal to 100 kA, following the movement of the electromechanical block 44 into its short-circuit position and for a voltage between the electrical conductors 12 with a value of 415 V before the electromechanical block 44 moves into its short-circuit position.

In a known manner, in the case in which the current flowing through the electrical conductors 12 is an AC current, during the transition of the electromechanical block 44 to its short-circuit position, the value of the current is equal to:

$$I(t)=I(\sin(\omega t+\alpha-\varphi)-\sin(\alpha-\varphi)\cdot e^{-(R/L)*t}),$$

where φ represents the phase shift between the current and the voltage for each electrical conductor 12, expressed in radians (rad), α represents the initiation angle expressed in radians, i.e. the angle measured with respect to the voltage across the corresponding conductor, for which the electromechanical block 44 transitions to the short-circuit position, ω represents the angular frequency in rad/second (rad/s), t represents the time in seconds and I represents the RMS value of the current in amps.

Thus, the current has a steady-state sinusoidal component $I*\sin(\omega t+\alpha-\varphi)$ and a transient aperiodic component $I*\sin(\alpha-\varphi)\cdot e^{-(R/L)*t}$. The aperiodic component decreases as the time t increases and is therefore at maximum amplitude for, for example, the first twenty milliseconds following the transition of the electromechanical block 44 to the short-circuit position.

The maximum amplitude of the first curve 202 is greater than those of the second 204 and third 206 curves. The first curve 202 is highly asymmetric, i.e. it is non-sinusoidal. This is due to the non-zero aperiodic component that has a large amplitude for at least the first twenty milliseconds following the transition of the electromechanical block 44 to the short-circuit position. For the second 204 and third 206 curves, the amplitude of the asymmetric component of the current is smaller than that of the asymmetric component of the current for the first curve 202.

Figure 4:
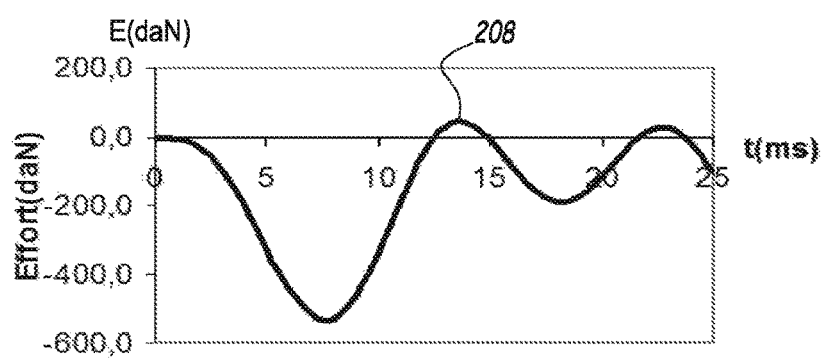
FIG. 4 is a curve representing a stress to which one of the electrical conductors of FIG. 1 is subjected during the setting up, by the shorting device, of a short circuit between the electrical conductors.

The high value of the amplitude of the current, overall greater than 100 kA peak value, flowing through the electrical conductors 12 generates significant stresses between the electrical conductors 12, as shown in FIG. 4. Specifically, FIG. 4 shows, in a fourth curve 208, a first lateral stress E1, expressed in decanewtons (daN), that is exerted on the electrical conductor 12 through which the current corresponding to the first curve 202 flows. The fourth curve 208 is obtained for a length of the electrical conductors 12 that is equal to 200 mm and a distance between each consecutive electrical conductor 12, measured along the transverse axis Y, that is equal to 70 mm. The first measured lateral stress E1 is at its maximum at the moment at which the intensity of the current flowing through said electrical conductor 12 is at its maximum, i.e. for a time t of the order of 8 ms. More generally, the currents flowing through each electrical conductor 12 influence the first lateral stress E1 to which the electrical conductor 12, through which the current corresponding to the first curve 202 flows, is subjected.

The observations made for the first lateral stress E1 are also valid for lateral stresses exerted on the other electrical conductors 12. Thus, the greater the amplitude of the current flowing through the electrical conductors 12, the greater the stresses to which the installation 10 is subjected and that are exerted between the electrical conductors 12.

Figure 5:
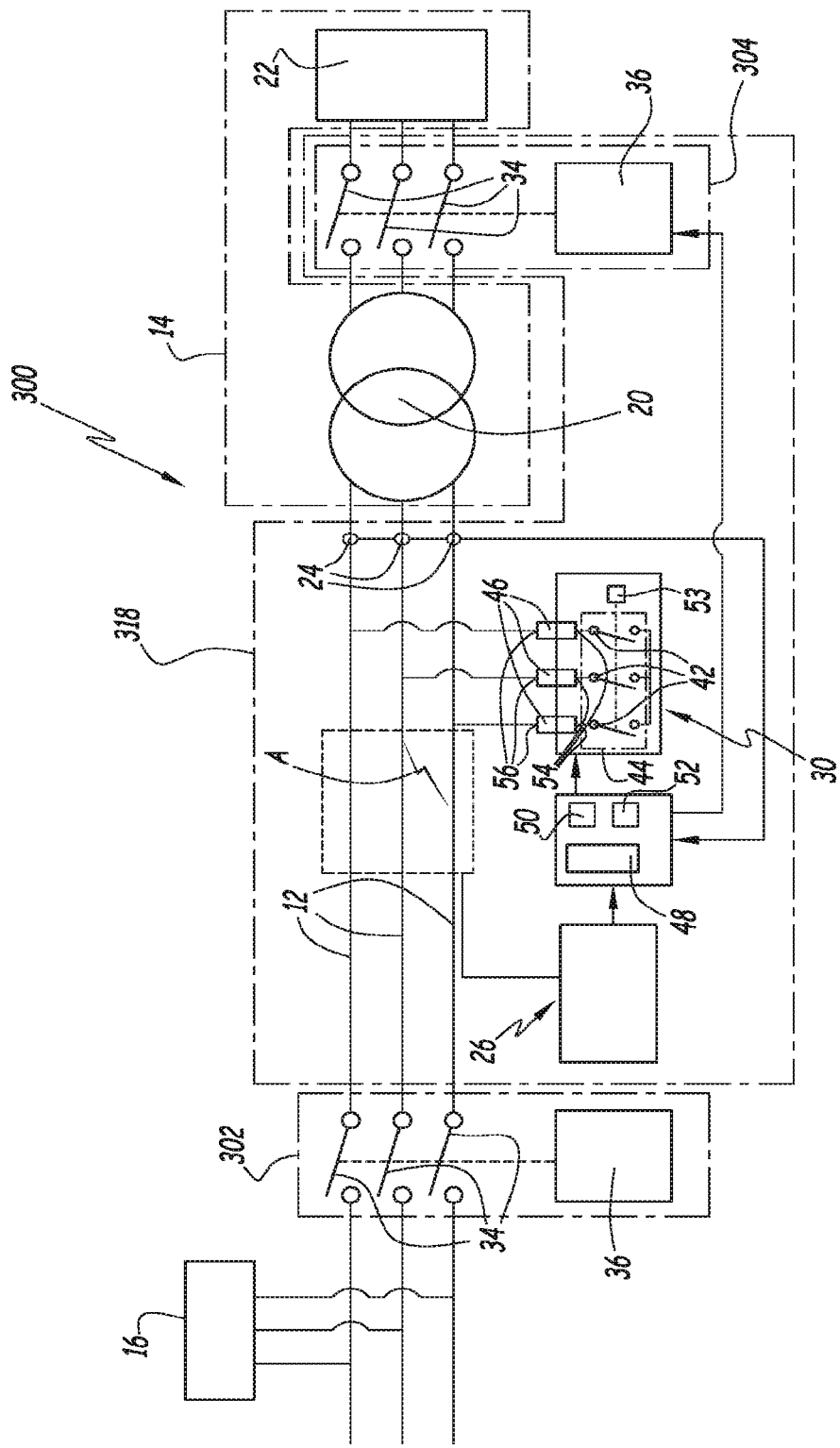
FIG. 5 is a representation analogous to that of FIG. 1 according to a second embodiment of the invention.

FIG. 5 corresponds to a second embodiment of the invention, for which the elements that are similar to those of the first embodiment comprise the same references and are not described again.

In FIG. 5, an installation 300 comprises a first three-phase circuit breaker 302 and a second three-phase circuit breaker 304 that are similar to the three-phase circuit breaker 28. The first three-phase circuit breaker 302 is connected downstream of the shorting device 30 with respect to the electrical grid 22 located upstream, and the second circuit breaker 304 is connected upstream of the shorting device 30. More specifically, the second circuit breaker 304 is positioned between the electrical transformer 20 and the electrical grid 22.

Thus, the installation 300 comprises a system for quenching an electric arc 318 and electrical conductors 12 that are connected to the transformer 20.

The quenching system 318 comprises the second three-phase circuit breaker 304. The second circuit breaker 304 is generally arranged on the medium voltage side, while the first circuit breaker 302 is arranged on the low voltage side.

The tripping member 52 is capable of tripping the second circuit breaker 304 when the detection software 48 detects the occurrence of the electric arc A. The operation of the second embodiment is similar to that of the first embodiment, apart from that in the first embodiment, the circuit breaker 28 opens its switches 34 that are arranged on the low voltage side, while in the second embodiment, the second circuit breaker 304 opens its switches 34 that are arranged on the medium voltage side. Furthermore, according to the second embodiment, the current sensors 24 are positioned downstream of the second three-phase circuit breaker 304.

The time taken by the circuit breaker 304 to move into its open position, following the detection of the electric arc A by the detection software 48, is generally of the order of 100 ms. Thus, the time taken for removing the short circuit created by the shorting device 30 is of the order of 100 ms for the installation 300.

The form of the currents flowing through the electrical conductors 12 is identical for the first and second embodiments of the invention.

Figure 6:
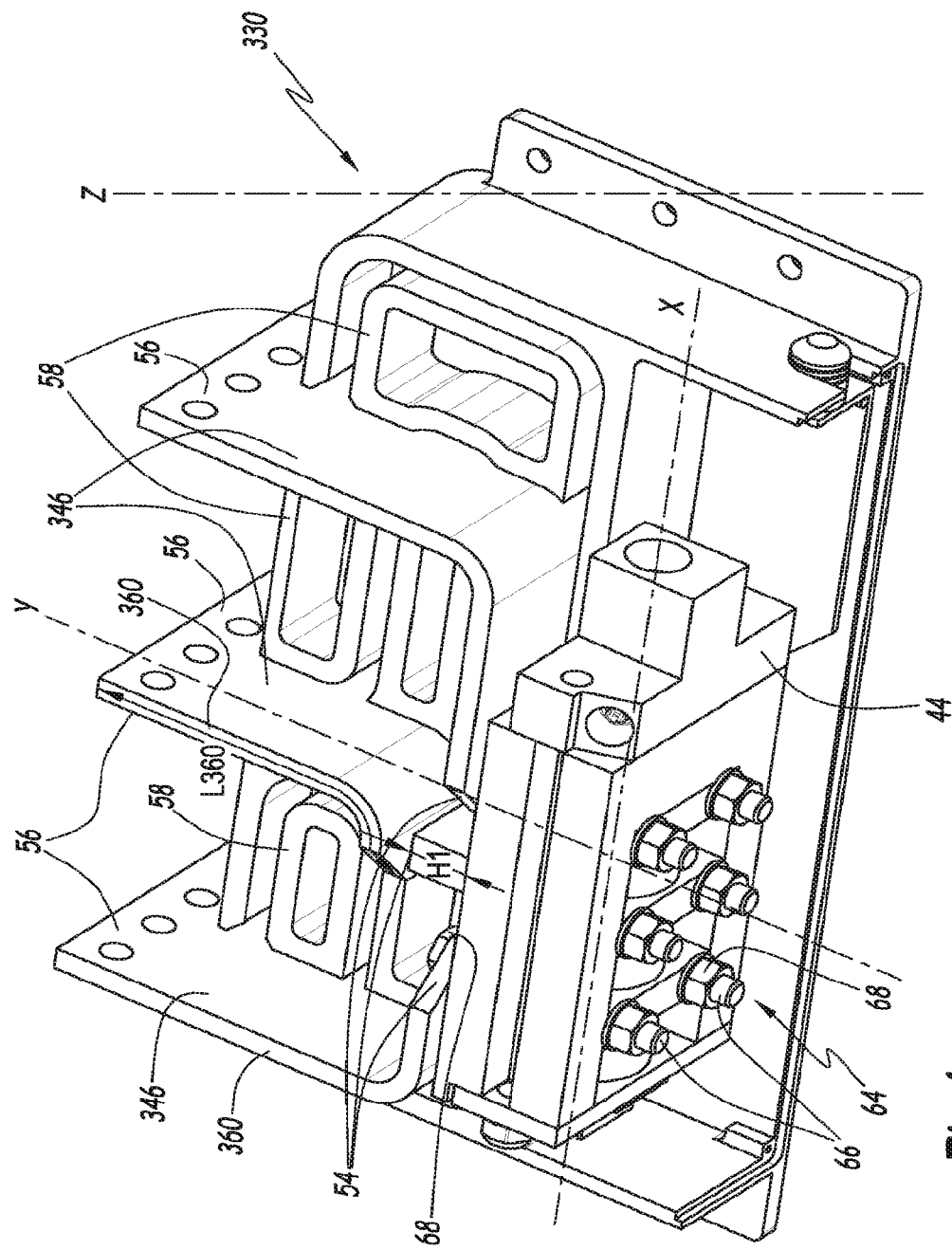
FIG. 6 is a view analogous to that of FIG. 2 according to a third embodiment of the invention.

In FIG. 6, a shorting device 330 is shown. The shorting device 330 is similar to the shorting device 30 according to the first embodiment, except that it comprises resistor elements 346 that are, along a plane parallel to the longitudinal axis X and the transverse axis Y, overall shaped like an L extending from its first connection end 54 to its second connection end 56. The resistor elements 346 are made of a material such as stainless steel.

Each resistor element 346 has a curvilinear length L360, measured along an edge 360 that substantially connects the first connection end 54 to the second connection end 56, that is greater than 200 mm. Each resistor element 346 also has, perpendicular to the edge 360, a cross section that is greater than or equal to 400 mm$^2$.

More generally, the dimensions of the resistor elements 346 and the material forming the resistor elements 346 are such that each resistor element 346 has an impedance whose value is between 0.3 m$\Omega$ and 1 m$\Omega$, preferably between 0.5 m$\Omega$ and 0.6 m$\Omega$, for a temperature of the resistor element 346 of between 0° C. and 100° C.

Figure 7:
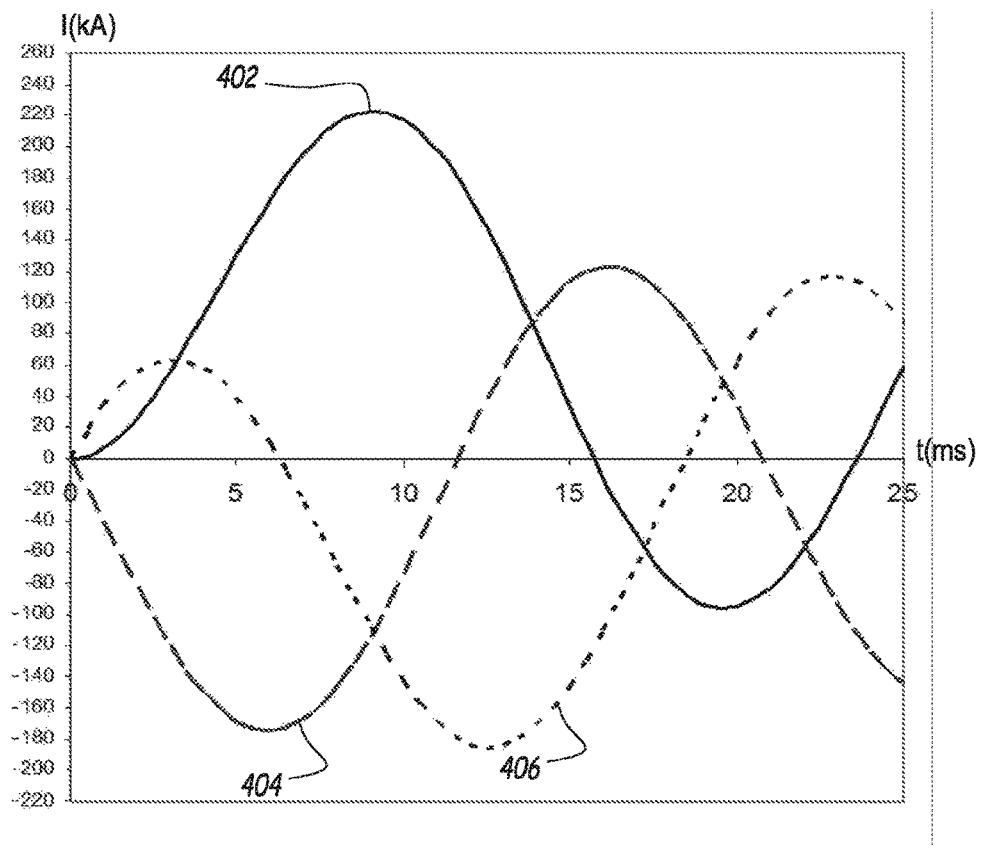
FIG. 7 is a set of three curves analogous to that of FIG. 3 for an electrical installation equipped with a quenching system of the prior art.

In FIG. 7, fifth 402, sixth 404 and seventh 406 curves correspond to the current, in terms of peak value, respectively flowing through each of the three electrical conductors when a short circuit is set up between the electrical conductors by a system for quenching an electric arc of the prior art, i.e. without resistor elements 46, 346. The fifth 402, sixth 404 and seventh 406 curves are obtained under conditions that are equivalent to those chosen for the first 202, second 204 and third 206 curves. In comparison with the first 202, second 204 and third 206 curves, it appears that the peak value of the current is higher for the fifth 402, sixth 404 and seventh 406 curves.

Figure 8:
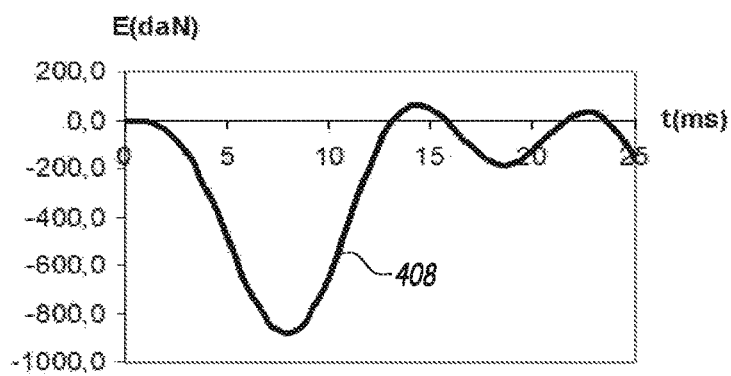
FIG. 8 is a curve analogous to that of FIG. 4 for an electrical installation equipped with a quenching system of the prior art.

In FIG. 8, an eighth curve 408 shows a second lateral stress E2 to which the electrical conductor through which the current corresponding to the second curve 402 flows is subjected. It appears that the second lateral stress E2 is greater than the first lateral stress E1. Specifically, as the amplitude of the currents that is seen in the fifth 402, sixth 404 and seventh 406 curves is greater than that seen in the first 202, second 204 and third 206 curves, this leads to greater stresses on the electrical conductors as part of a quenching system of the prior art in comparison with the quenching systems 18, 318 that are in accordance with the first, second and third embodiments.

By virtue of the invention, a maximum amount of stress exerted on the electrical conductor 12, through which the current corresponding to the first curve 202 flows, is reduced by around 40% overall. The quenching system 18 therefore allows the stresses exerted on the electrical conductors 12 during the transition of the electromechanical block 44 to its short-circuit position to be significantly reduced. Specifically, the resistor elements 46, 346 allow the amplitude of the aperiodic component of the current to be reduced for each electrical conductor 12 by modifying the overall resistance of the installation 10, 300 in order to modify the phase shift between the current flowing through and the voltage across each electrical conductor 12. The modification of the phase shift allows the value of the power factor and of the aperiodic component to be reduced for each electrical conductor 12. The aperiodic component has a very negative influence on the installation 10, 300 and is capable of greatly increasing, for example multiplying by 1.5, the peak value of the current flowing through the corresponding electrical conductor 12.

The shorting device 30, 330 allows a reduction in the transient aperiodic component, and hence in the peak value of the transient current flowing through the corresponding electrical conductor 12, in order to reduce the stresses to which the electrical installation 10, 300 and, more specifically, the electrical conductors 12 are subjected. This reduction of the aperiodic component and lessening of the stresses are obtained without significantly increasing the time taken for changing over the electric arc A. The changeover time corresponds to the time required for the electric arc A, which occurs between the electrical conductors 12, to pass through the shorting device 30, 330.

Specifically, the arc changeover time is preferably between 0.1 ms and 2 ms.

Furthermore, the large volume of the resistor elements 46, 346 allows the temperature of the resistor elements to be limited to a value of less than 500° C. for a current flowing therethrough that is equal to 100 kA over 50 ms.

Lastly, by virtue of the quenching system 18, 318 according to the invention, the stresses to which the installation 300 is subjected are limited for a transitional period, then after a predetermined response time, the circuit breaker electrically isolates the power supply source 14, and more generally the electrical grid 22, from the electrical conductors 12.

The resistor elements 46, 346 make it possible to reduce the power factor of the installation 10, to reduce both the peak value and the mean value of the current, to limit heating in the installation 10 and not to hinder the quenching of the electric arc by changing over to the shorting device 30, 330. The changeover corresponds to the passage of the electric arc through the shorting device 30.

The voltage between the electrical conductors 12 is generally lower than 690 V when the electromechanical block 44 is in its rest position.

In one variant, the electrical installation 10 is a single-phase or two-phase installation, respectively comprising a phase conductor and a neutral conductor or two phase conductors.

According to another variant, the current flowing through the electrical conductors 12 is a DC current and the voltage delivered to the electrical conductors 12 is lower than 400 V.

The invention claimed is:

1. A device for shorting an electrical installation including at least two electrical conductors, the device comprising:
   at least two connection terminals, each configured to be connected to a respective electrical conductor;
   a parallelepipedic electromechanical block configured to set up a short circuit between the connection terminals;
   at least two resistors, one for each of the two connection terminals, each of the at least two resistors being configured to connect a corresponding one of the connection terminals to the corresponding electrical conductor, each of the resistors comprising a first connection end connected to the corresponding connection terminal and a second connection end configured to be connected to the corresponding electrical conductor,
   wherein each of the resistors has an impedance, and a variation in a value of the impedance is less than 1 mΩ for a temperature of the resistors of between 0° C. and 200° C.

2. The device as claimed in claim 1, wherein the impedance value of each of the resistors is between 0.3 mΩ and 1 mΩ for a temperature of the resistors of between 0° C. and 100° C.

3. The device as claimed in claim 1, wherein the electromechanical block comprises a moving member configured to switch between a rest position in which the connection terminals are electrically isolated from one another and a short-circuit position in which the connection terminals are mutually connected.

4. The device as claimed in claim 1, wherein the resistors are electrically isolated from one another.

5. The device as claimed in claim 1, wherein each of the resistors is made of stainless steel.

6. The device as claimed in claim 1, wherein each of the resistors comprises an edge connecting the first connection end and the second connection end, and each of the resistors has a cross section, perpendicular to the corresponding edge, that is greater than or equal to 400 mm$^2$.

7. The device as claimed in claim 1, wherein at least one connection terminal is raised by a height with respect to the other connection terminals, the raised height being between 2 cm and 4 cm.

8. The device as claimed in claim 1, wherein each of the resistors is in boustrophedon form.

9. A system for quenching an electric arc that can occur in an electrical installation, the installation including at least two electrical conductors, the system comprising:
   at least one device for detecting the electric arc on each conductor;
   at least one electrically isolating circuit breaker connected to the electrical conductors between the electrical installation and a power supply source of the electrical installation;
   a shorting device connected to the electrical conductors;
   an electronic device configured to control the shorting device so that the shorting device is in a state for setting up a short circuit between the electrical conductors when the electric arc is detected by the detection device, and configured to trip the at least one electrically isolating circuit breaker when the electric arc is detected by the detection device,
   wherein the shorting device includes
   at least two connection terminals, each configured to be connected to a respective electrical conductor;
   a parallelepipedic electromechanical block configured to set up a short circuit between the connection terminals;
   at least two resistors, one for each of the two connection terminals, each of the at least two resistors being configured to connect a corresponding one of the connection terminals to the corresponding electrical conductor, each of the resistors comprising a first connection end connected to the corresponding connection terminal and a second connection end configured to be connected to the corresponding electrical conductor,
   wherein each of the resistors has an impedance, and a variation in a value of the impedance is less than 1 mΩ for a temperature of the resistors of between 0° C. and 200° C.

10. The system as claimed in claim 9, wherein the shorting device is positioned downstream of the at least one electrically isolating circuit breaker with respect to the electrical power supply source.

* * * * *